(12) United States Patent
Hamasaki et al.

(10) Patent No.: US 7,088,523 B2
(45) Date of Patent: Aug. 8, 2006

(54) LENS BODY TUBE

(75) Inventors: Takuji Hamasaki, Saitama-ken (JP); Tomoaki Kobayashi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/258,860

(22) Filed: Oct. 27, 2005

(65) Prior Publication Data
US 2006/0092526 A1    May 4, 2006

(30) Foreign Application Priority Data
Oct. 29, 2004    (JP)    ............................. 2004-315247

(51) Int. Cl.
G02B 15/14    (2006.01)
(52) U.S. Cl. .................... 359/694; 359/701; 359/819
(58) Field of Classification Search ........ 359/694–704, 359/819, 821–823
See application file for complete search history.

(56) References Cited

U.S. PATENT DOCUMENTS

| | | | |
|---|---|---|---|
| 5,528,430 A * | 6/1996 | Hamasaki .................... | 359/701 |
| 6,008,954 A * | 12/1999 | Shintani et al. ............. | 359/704 |
| 6,631,035 B1 * | 10/2003 | Iikawa et al. ................ | 359/699 |
| 6,751,032 B1 | 6/2004 | Nomura et al. ............. | 359/819 |
| 6,819,502 B1 | 11/2004 | Nomura et al. ............. | 359/701 |
| 6,829,103 B1 | 12/2004 | Kobayashi et al. ......... | 359/700 |
| 6,873,472 B1 | 3/2005 | Suzuki ........................ | 359/700 |
| 6,906,871 B1 | 6/2005 | Tanaka et al. ............... | 359/700 |
| 6,909,464 B1 | 6/2005 | Nomura et al. ............. | 348/357 |

FOREIGN PATENT DOCUMENTS

| | | |
|---|---|---|
| JP | 8304688 | 11/1996 |
| JP | 10-170796 | 6/1998 |

OTHER PUBLICATIONS

English Language abstract of JP 8-304688.

* cited by examiner

*Primary Examiner*—Ricky Mack
*Assistant Examiner*—M. Hasan
(74) *Attorney, Agent, or Firm*—Greenblum & Bernstein, P.L.C.

(57) ABSTRACT

A lens body tube configured to support at least one lens inside an inner tube such that the at least one lens can be translated along the optical axis direction of the lens body tube includes a cam ring configured to be rotatably supported around the outer circumferential surface of the inner tube, the at least one lens being configured to be translated along the optical axis direction accompanied by the rotation of the cam ring, a plurality of cams provided on the inner circumferential surface of the cam ring, a plurality of cam followers provided on a lens frame supporting each of the at least one lens, each of the plurality of cam followers being engaged with a corresponding one of the plurality of cams through an opening provided on the inner tube, and a plurality of first protrusions, each of which is formed integrally with a corresponding one of the plurality of cams, and has contact with the outer circumferential surface of the inner tube.

19 Claims, 6 Drawing Sheets

LENS BODY TUBE

BACKGROUND OF THE INVENTION

The present invention relates to a lens body tube configured to carry out a zooming operation and/or a focusing operation with a plurality of lenses being translated along the optical axis direction of the lens body tube using a cam ring.

In a lens body tube that is configured to carry out a zooming operation and/or a focusing operation with lenses, which is incorporated in the lens body tube, being translated along an optical axis direction of the lens body tube, each of the lenses is movably supported in an inner tube acting as a guide tube for translatory movement such that each of the lenses can be translated along the optical axis direction. Further, a cam ring for which a rotating operation is to be carried out is fitted around the outer circumferential surface of the inner tube, and a cam, which is formed on the inner circumferential surface of the cam ring, is engaged with a cam follower with which each of the lenses is provided. In other words, by rotating the cam ring integrally with a zoom ring or a focus ring being rotated during the zooming or focusing operation, each of the lenses engaging with the cam is translated along the optical axis direction of the lens body tube according to the shape of the cam, so that the zooming or focusing operation is carried out.

Even when the cam ring is fitted around the outer circumferential surface of the inner tube, and the cam follower of the lens is engaged with the cam formed on the inner circumferential surface of the cam ring, in order to rotate the cam ring smoothly, it is needed to secure a gap in the radial direction of the lens body tube such that the cam is engaged with the cam follower between the inner circumferential surface of the cam ring and the outer circumferential surface of the inner tube. For this reason, conventionally, there are formed bayonet pieces that are protruded inward along the radial direction at a plurality of places in the circumferential direction on one end of the cam ring, that is, on the rear end of the cam ring to be fitted around the outer circumferential surface of the inner tube in the optical axis direction. The inward top surfaces of the bayonet pieces have contact with the outer circumferential surface of the inner tube. Further, there are formed bearing ribs at a plurality of places in the circumferential direction on the outer circumferential surface of the leading end of the inner tube. The bearing ribs have contact with the inner circumferential surface of the cam ring. Thereby, the aforementioned gap is secured. In addition, the bayonet pieces are engaged with bayonet portions provided on the outer circumferential surface of the inner tube. On the leading end of the inner tube, there is formed a flange that is protruded outward along the radial direction. The flange has contact with the leading end face of the cam ring in the optical axis direction, so that the position of the cam ring is limited in the optical axis direction, and the cam ring never drops off the inner tube in the optical axis direction.

In this configuration, each of the bayonet pieces is formed to have a longer length in the circumferential direction than a required one, and is located at a predetermined position in the circumferential direction, so that engagement between the bayonet pieces and the bayonet portions can not be unfastened even though the cam ring is rotated around the optical axis by a required angle. For example, when the rotation angle of the cam ring is 90 degrees, there are arranged three bayonet pieces in the circumferential direction. Therefore, the number of bearings for supporting the cam ring on the outer circumferential surface of the inner tube is the same number of three as that of the bayonet pieces. The number of this level of the bearings is not enough to prevent the cam ring from moving in the radial direction due to vibration and/or impact applied to the lens body tube, and as a result, backlash of the cam ring is caused in the radial direction. Such backlash can be a factor that generates some errors in the moving position of the lens in the optical axis direction corresponding to a rotation angle of the cam ring, and can thereby be a problem in the case of manufacturing the lens body tube as designed.

In order to restrain such backlash in the radial direction, Japanese Unexamined Patent Publication No. HEI8-304688 discloses a configuration where an outer tube supports a member that has elastic force, the member having elastic contact with the outer circumferential surface of an inner tube. In addition, Japanese Unexamined Patent Publication No. HEI10-170796 discloses a configuration, in a lens body tube in which a moving member is supported to move relative to a fixed body tube, where anti-backlash members are arranged on the moving member.

When the technology disclosed in Japanese Unexamined Patent Publication No. HEI8-304688 or No. HEI10-170796 is applied to the aforementioned lens body tube provided with the cam ring, the cam ring is required to have an anti-backlash member attached to a part thereof. Thereby, since the number of components and the number of processes for assembling the lens body tube are increased, there is caused a problem that the total cost of the lens body tube rises. Moreover, since it is necessary to secure a space for attaching an anti-backlash member to the lens body tube, the freedom in design of the cam is limited. On the other hand, when a convex cam is formed as a cam to be formed on the inner circumferential surface of the cam ring, it is considered one of solutions for restraining the backlash that the top surface of the cam, which faces inward along the radial direction, is made contact with the outer circumferential surface of the inner tube to increase the contact area between the cam and the inner tube. However, in the case of the cam ring being formed by resin molding as a cam ring of recent years, there is often generated a small strain due to the molding. Therefore, it is hard to fit the cam ring around the outer circumferential surface of the inner tube. In addition, even though the cam ring is fitted around the outer circumferential surface, the cam ring is likely not to be smoothly rotated because of the friction between the top surface of the cam and the outer circumferential surface of the inner tube.

SUMMARY OF THE INVENTION

The present invention is advantageous in that a lens body tube, which is capable of restraining backlash between a cam ring and an inner tube in the radial direction of the lens body tube without increasing the number of components, is provided.

According to an aspect of the invention, there is provided a lens body tube configured to support at least one lens inside an inner tube such that the at least one lens can be translated along the optical axis direction of the lens body tube, which is provided with a cam ring configured to be rotatably supported around the outer circumferential surface of the inner tube, the at least one lens being configured to be translated along the optical axis direction accompanied by the rotation of the cam ring, a plurality of cams provided on the inner circumferential surface of the cam ring, a plurality of cam followers provided on a lens frame supporting each of the at least one lens, each of the plurality of cam followers being engaged with a corresponding one of the plurality of cams through an opening provided on the inner tube, and a plurality of first protrusions, each of which is formed integrally with a corresponding one of the plurality of cams, and has contact with the outer circumferential surface of the inner tube.

Optionally, each of the plurality of first protrusions may be protruded inward along the radial direction of the lens body tube on a part of the inward top surface of a corresponding one of the plurality of cams.

Still optionally, each of the plurality of cam followers may include a recessed potion that is formed to avoid interfering with the plurality of first protrusions.

Optionally, the opening may extend in the optical axis direction with a predetermined width in the circumferential direction of the lens body tube. Optionally, each of the plurality of first protrusions may be formed longer than the width.

Yet optionally, the cam ring may include a plurality of second protrusions that are configured to have contact with the outer circumferential surface of the inner tube to support the cam ring around the inner tube. Optionally, the plurality of second protrusions may be arranged evenly spaced apart in the circumferential direction. Optionally, the plurality of cams may be as many as the plurality of second protrusions. Optionally, each of the plurality of first protrusions is arranged substantially at the midpoint between each adjacent couple of the plurality of second protrusions, in the circumferential direction.

Optionally, the cam ring may be formed by resin molding.

Optionally, the cam ring is rotated during one of the zooming operation and the focusing operation.

BRIEF DESCRIPTION OF THE ACCOMPANYING DRAWINGS

DETAILED DESCRIPTION OF THE EMBODIMENTS

Figure 1:
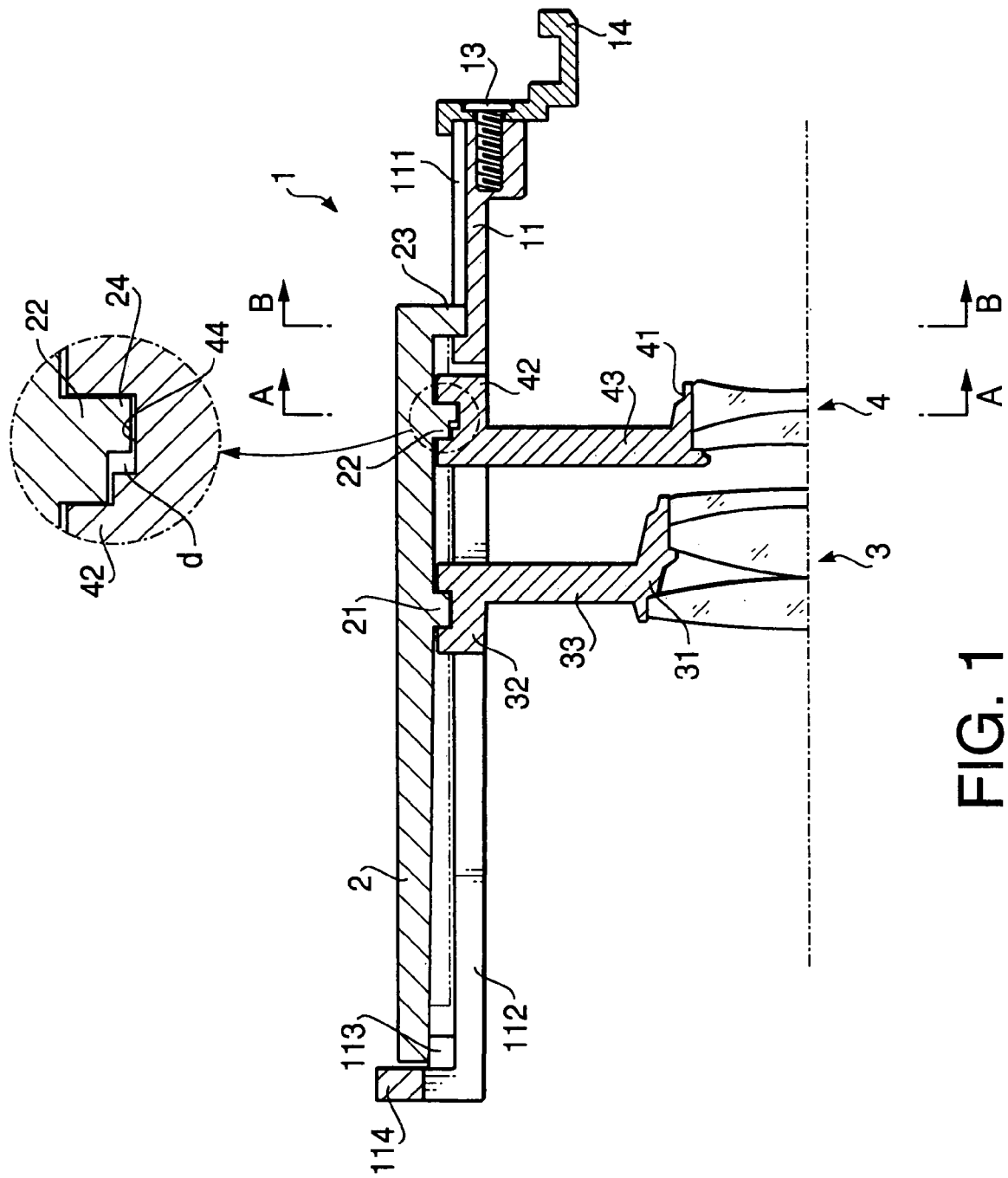
FIG. 1 is a half cross-sectional view of a major portion of a lens body tube in an embodiment according to the present invention with respect to the optical axis of the lens body tube.

An embodiment according to the present invention will be explained with reference to accompanying drawings. FIG. 1 is a half cross-sectional view of a lens body tube according to the present invention with respect to the optical axis of the lens body tube, which shows only the structure constituted by a cam ring and two lenses that are movable along the optical axis direction based on rotation of the cam ring. In the lens body tube, a main tube 1 is configured with an inner tube 11 shown in FIG. 1 and an outer tube that is not shown in FIG. 1 and is integrally provided outside the inner tube 11. On the rear end of the main tube, there is fixed a bayonet portion 14 with a screw 13. Thereby, the lens body tube is attachable to a lens mount of a camera body that is not shown in FIG. 1. The inner tube 11 is configured as a guide tube for translatory movement of below-mentioned lens groups along the optical axis. Around the inner tube 11, there is fitted a cam ring 2 that is formed of a hollow cylinder by resin molding. The cam ring 2 is configured rotatable around the optical axis with a zoom ring that is not shown in FIG. 1. In addition, in the inner tube 11, there is, movably along the optical axis direction, supported a plurality of lens groups, i.e., a first lens group 3 and a second lens group 4 in this case. Respective lens frames 31 and 41 supporting the lens groups 3 and 4 are provided with cam followers 32 and 42, respectively, which are engaged with the cam ring 2.

Figure 2:
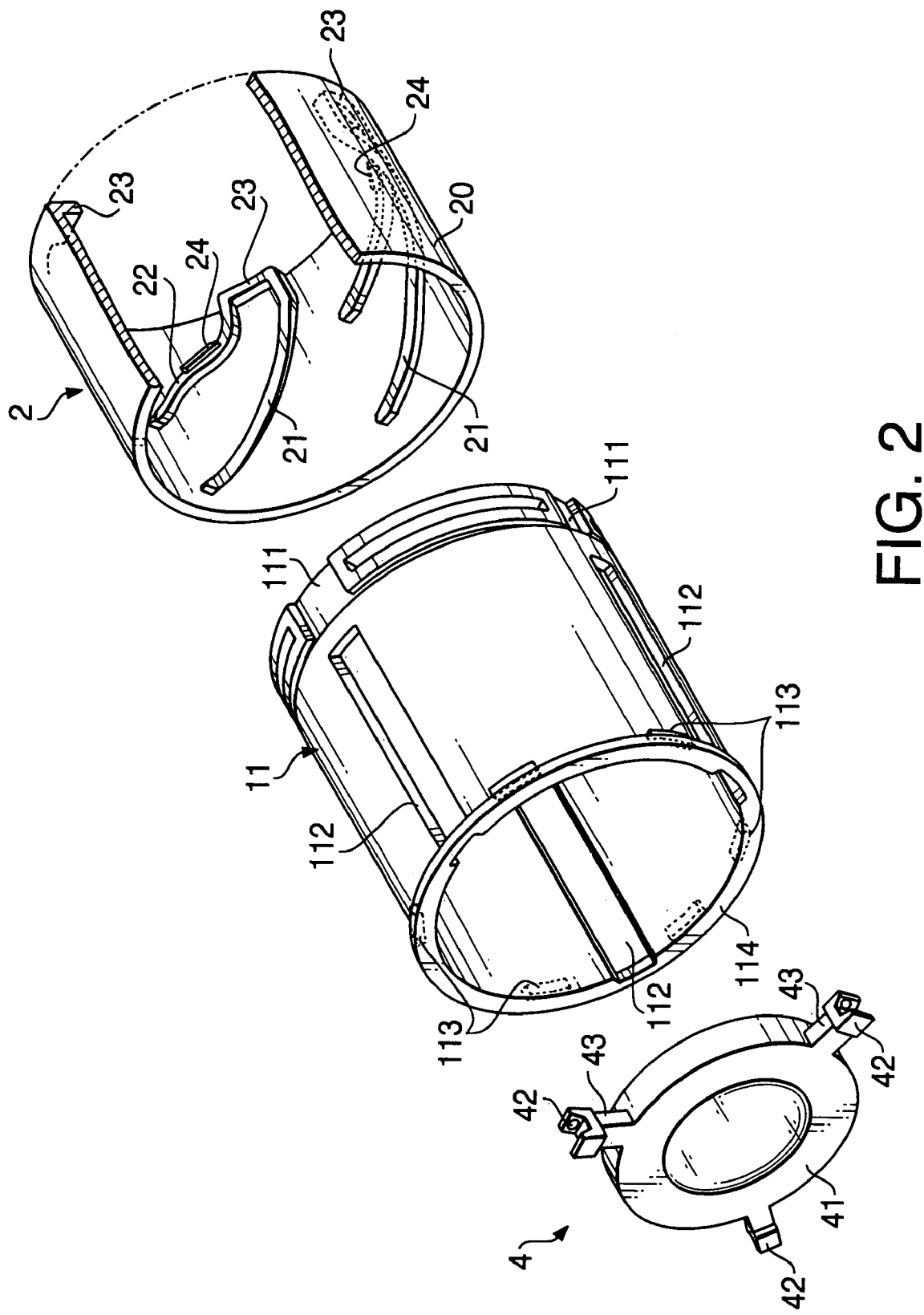
FIG. 2 is a perspective view schematically showing the constitution of a major portion of the lens body tube.
Figure 3:
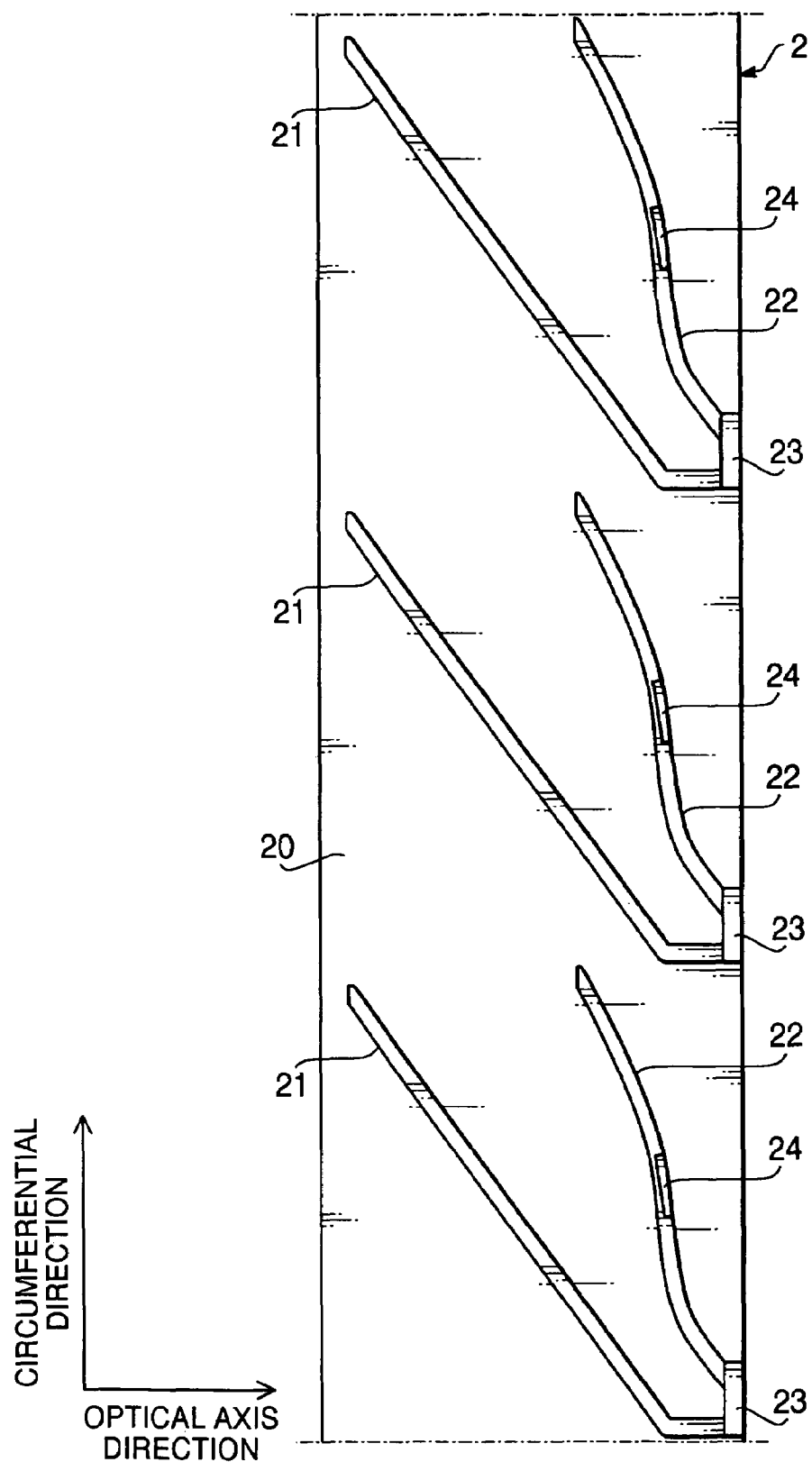
FIG. 3 is a development elevation of the inner circumferential surface of a cam ring in the embodiment.

FIG. 2 is a perspective view that schematically shows the constitution of the inner tube 11, the cam ring 2, and the second lens group 4. Since the first lens group 3 is substantially the same as the second lens group 4, the first lens group 3 is not shown in FIG. 2. The cam ring 2 is formed with a first cam 21 and a second cam 22 that are provided on the inner circumferential surface of a ring portion 20 formed of a hollow cylinder. The first and second cams 21 and 22 are protruded inward along the radial direction, and have rectangular cross sections, respectively. FIG. 3 is a development elevation of the inner circumferential surface of the cam ring 2. In this case, both of the first and second cams 21 and 22 are formed on each of three areas into which the inner circumferential surface of the cam ring 2 is divided equally along the circumferential direction, and three pairs of the first and second cams 21 and 22 have substantially the same shape. The first cam 21 is formed as a linear cam that is slanted to the optical axis direction in the development elevation. The second cam 22 is formed as a non-linear cam of which curvature is partially different.

In addition, on the rear end of the ring portion 20 of the cam ring 2 in the optical axis direction, there are formed three bayonet pieces 23 that are arranged evenly spaced apart in the circumferential direction and are protruded inward along the radial direction with a required height. Each of the bayonet pieces 23 is engaged with a corresponding one of three groove-shaped bayonet portions 111 that are provided in the circumferential direction on the rear end of the inner tube 11 in the optical axis direction, so as to prevent the cam ring 2 from dropping off the inner tube 11 in the optical axis direction and make the inner circumferential surface of each of the bayonet pieces 23 contact with the outer circumferential surface of the inner tube 11.

Figure 4:
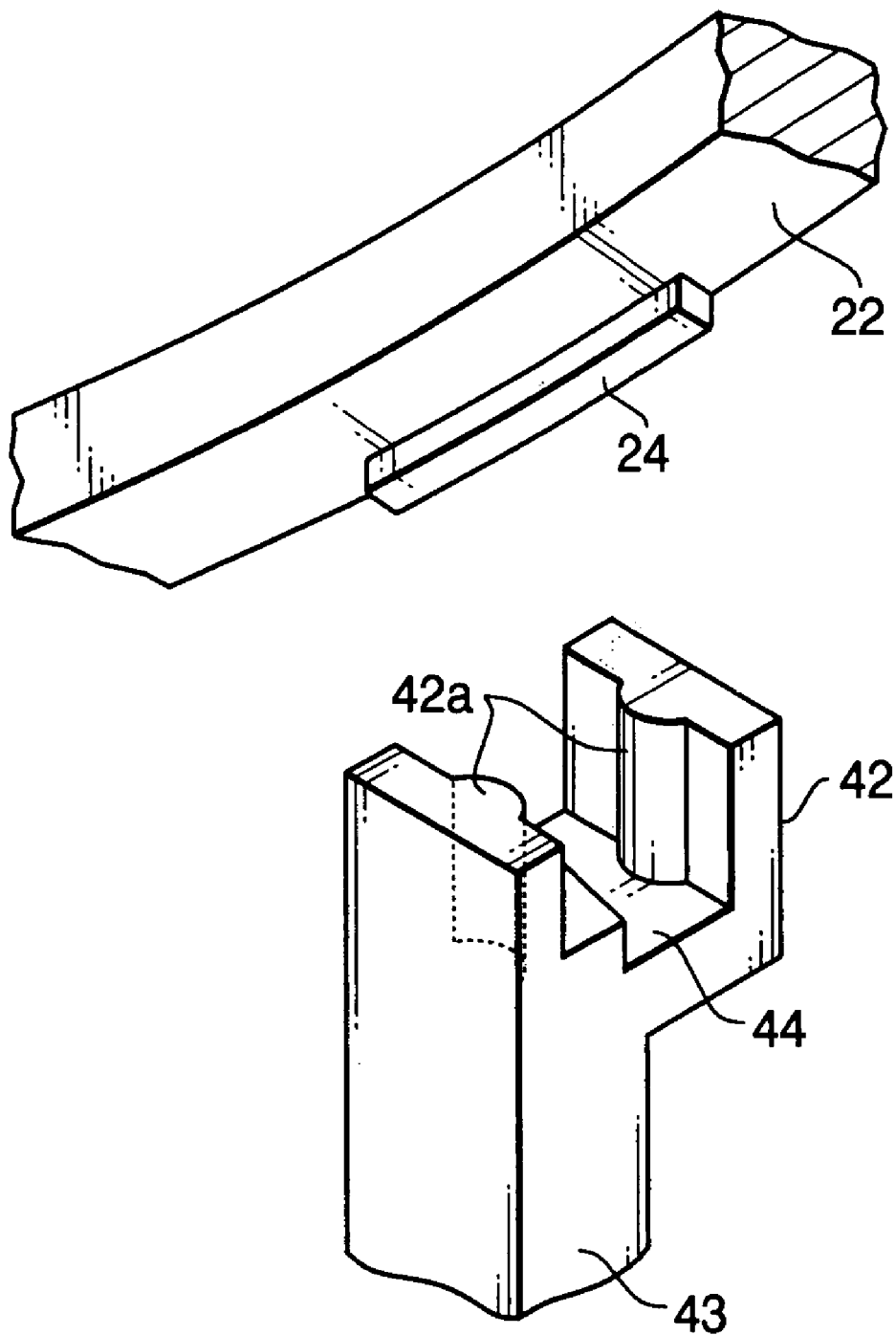
FIG. 4 is an enlarged perspective view of a relevant part of a cam and a cam follower in the embodiment.
Figure 5A:
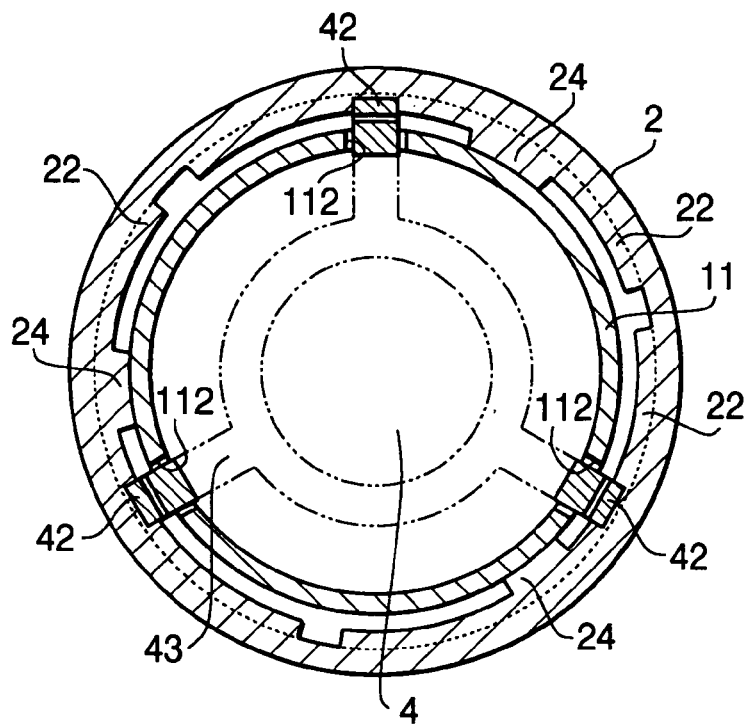
FIGS. 5A and 5B are cross-sectional views of the lens body tube along an A—A line and a B—B line shown in FIG. 1, respectively.
Figure 5B:
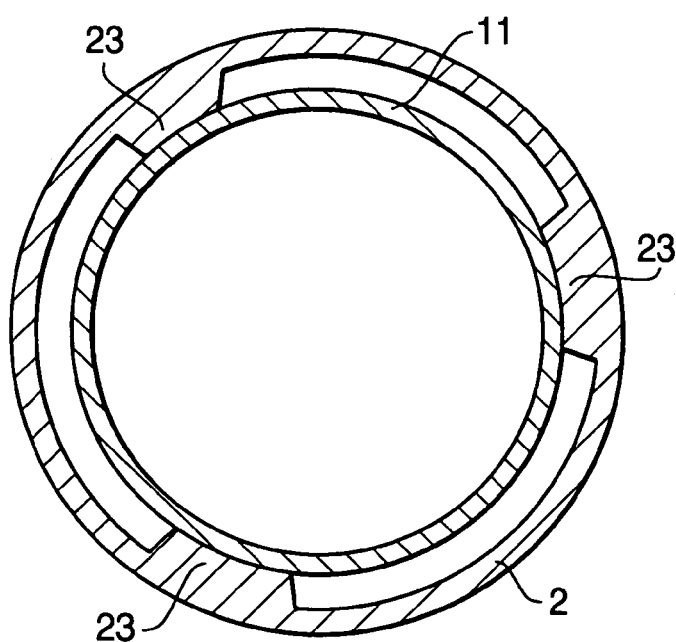

As shown in FIGS. 2 and 3, at a part of the top surface, which faces inward along the radial direction, of each of the three second cam 22, there is formed a contact protrusion 24. FIG. 4 is an enlarged perspective view of the contact protrusion 24. FIGS. 5A and 5B are cross-sectional views of the lens body tube along an A—A line and a B—B line shown in FIG. 1, respectively. A part of the top surface of each of the second cams 22 is protruded inward along the radial direction to form the contact protrusion 24. The contact protrusion 24 has a longer length than the width of a below-mentioned guide groove 112, which is formed on the inner tube 11, along the circumferential direction. The contact protrusion is further formed at the midpoint in the circumferential direction between each couple of the three bayonet pieces 23. It is needless to say that the contact protrusion 24 is formed as well as the first and second cams 21 and 22 at the same time when the cam ring 2 is formed by resin molding. In addition, it is noted that in this embodiment, each of the first and second cams 21 and 22 is configured such that one end thereof is connected with a corresponding one of the bayonet pieces 23, and thereby, even though a stress is applied to each of the first and second cams 21 and 22, damage against each of the first and second cams 21 and 22 is reduced to increase the mechanical reliability of the cam ring 2.

As shown in FIG. 2, at each of three places, which are evenly spaced apart in the circumferential direction, of the inner tube 11, there is formed the guide groove 112 extending in the optical axis direction. In addition, on the leading end of the inner tube 11 in the optical axis direction, there is integrally formed a flange 114 that is protruded outward along the radial direction. At each of six places along the flange 114 in the circumferential direction on the inner tube 11, there is integrally formed a circular-arc-shaped bearing rib 113. Some of these six bearing ribs 113 are formed at places that do not interfere with the guide grooves 112. The flange 114 regulates the position of the leading end of the cam ring 2 in the optical axis direction, when the cam ring 2 is fitted around the inner tube 11. The bearing ribs 113 bear the inner circumferential surface of the leading end of the cam ring 2. The cam ring 2 is concentrically supported along the outer circumferential surface of the inner tube 11 by the bearing ribs 113 and the bayonet pieces 23.

Figure 6:
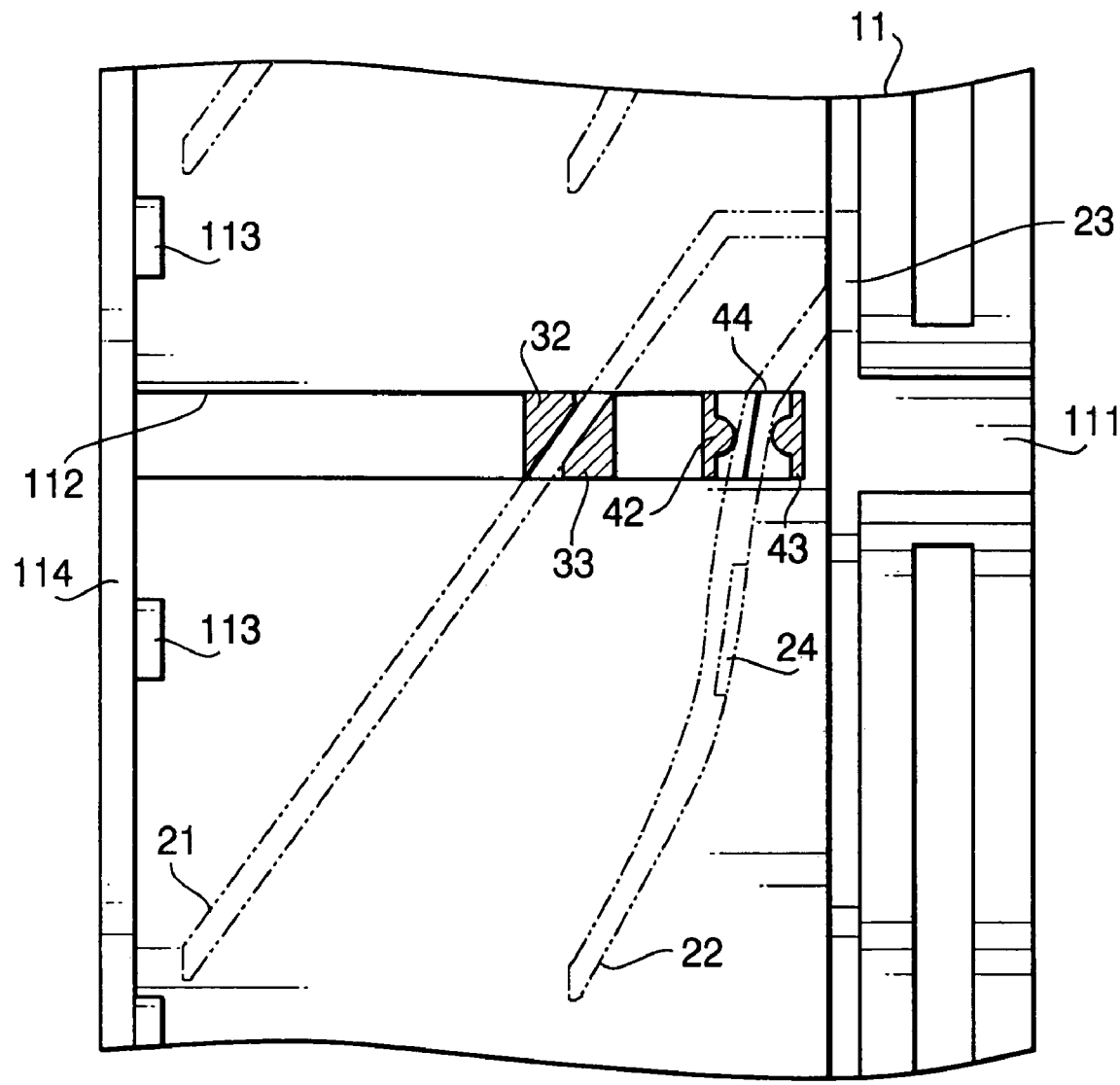
FIG. 6 is a top view of an inner tube in the embodiment.

Each of three parts on the outer circumferential surface of the lens frame 41 of the second lens group 4 is protruded to form a radially extending stem 43 to be passed completely through a corresponding one of the three guide grooves 112 from the inside to the outside of the inner tube 11. On the leading end face of each of the stems 43, there is formed the bifurcated cam follower 42, which is placed opposite the inner circumferential surface of the cam ring 2. In a similar manner, as shown in FIG. 1, the lens frame 31 of the first lens group 3 is provided with stems 33 that are radially protruded therefrom to be passed completely through the guide groove 112, and the cam follower 32 is formed on the leading end face of each of the stems 33. In addition, as shown in FIG. 6 that is a top view of the inner tube 11, the cam follower 32 of the first lens group 3 is formed tapered to grip the first cam 21 in the optical axis direction. As shown in FIG. 4, the cam follower 42 of the second lens group 4 is provided with a pair of cylinder-shaped rounded surfaces 42a to grip the second cam 22 in the optical axis direction. Moreover, on a part of the inner bottom face, which has contact with the second cam 22, of the cam follower 42 of the second lens group 4, there is formed an undercut 44 to avoid interfering with the contact protrusion 24. As shown in FIG. 1, there is a clearance d in the optical axis direction between the undercut 44 and the contact protrusion 24. Thereby, the cam follower 42 is allowed to move smoothly. Further, there is provided a small clearance, which is not shown in FIG. 1, between the bottom face of the undercut 44 and the surface of the contact protrusion 24 opposite the bottom face of the undercut 44.

According to the lens body tube that have the aforementioned constitution, when the cam ring 2 is rotated accompanied by the rotating operation of the zoom ring that is not shown in the accompanying drawings, the first and second lens groups 3 and 4 are translated along the optical axis direction by the cam followers 32 and 42 being moved according to the shape of the first and second cams 21 and 22, respectively. Accompanied by rotation of the cam ring 2, the cam followers 32, which are engaged with the first cams 21, of the first lens group 3 are moved along the optical axis direction in the guide grooves 112, so that the first lens group 3 can be translated along the optical axis direction. In a similar fashion, accompanied by rotation of the cam ring 2, the cam followers 42, which are engaged with the second cams 22, of the second lens group 4 are moved along the optical axis direction in the guide grooves 112, so that the second lens group 4 can be translated along the optical direction. In this case, since each of the cam followers 42 of the second lens group 4 is provided with the undercut 44, even though the cam followers 42 are relatively moved along the second cams 22 to reach the contact protrusions 24, the contact protrusions 24 pass through the undercuts 44, so that smooth movements of the cam followers 42 are not disturbed. Thereby, the first and second lens groups 3 and 4 are set at respective required positions on the optical axis.

Moreover, in this lens body tube, when the cam ring 2 is fitted with the outer circumferential surface of the inner tube 11, the bayonet pieces 23, which are provided at three places in the circumferential direction on the rear end of the ring portion 20 in the optical axis direction, are engaged with the bayonet portions 111 that are formed outward along the radial direction at three places in the circumferential direction on the rear end of the inner tube 11 in the optical direction. Thereby, the cam ring 2 is prevented from dropping off the inner tube 11 in the optical axis direction. In addition, the inner circumferential surfaces of the bayonet pieces 23 have contact with the outer circumferential surface of the inner tube 11, and at the same time, the inner circumferential surface of the leading end of the cam ring 2 has contact with the six bearing ribs 113 provided on the outer circumferential surface of the inner tube 11. Thereby, the cam ring 2 can be concentrically supported with respect to the inner tube 11. Furthermore, the inward top surface of the contact protrusion 24, which is provided at a part of the inward top surface of each of the three second cam 22, has contact with the outer circumferential surface of the inner tube 11. Therefore, the cam ring 2 is also concentrically supported at the contact portions thereof with the inner tube 11, with respect to the inner tube 11.

In this way, both end portions of the cam ring 2 in the optical axis direction are supported on the outer circumferential surface of the inner tube 11 by the three bayonet pieces provided at different places in the circumferential direction and the six bearing ribs 113. Further, the middle portion of the cam ring 2 in the optical axis direction is supported by the three contact protrusions 24 being in contact with the middle portion. In addition, the bayonet pieces 23 are located evenly spaced apart in the circumferential direction, as well as the bearing ribs 113 and the contact protrusions 24. Consequently, the condition of the cam ring 2 being fitted around the inner tube 11 is maintained with a lot of portions, which are arranged evenly spaced apart in the circumferential direction, being in contact with the outer circumferential surface of the inner tube 11. Accordingly, compared with the case where the cam ring 2 is supported only by the bayonet pieces 23 and the bearing ribs 113, the cam ring 2 can be supported more stably with backlash being restrained. On the other hand, when the cam ring 2 is fitted around the inner tube 11, since only the inward top surfaces of the three contact protrusions 24 have contact with the outer circumferential surface of the inner tube 11, the cam ring 2 is allowed to be more smoothly fitted around the inner tube 11, compared with the case of the inward top surfaces of the second cam 22 having contact with the outer circumferential surface of the inner tube 11.

It is noted that in this embodiment, the length of the contact protrusion 24 in the circumferential direction is longer than the width of the guide groove 112. Thereby, even though the cam ring 2 is rotated until the contact protrusion 24 reaches a position where the contact protrusion 24 faces the guide groove 112, the inward top surface of the contact protrusion 24 does not fail to have contact with the outer circumferential surface. In order to keep such a condition, it is desirable that the length of the contact protrusion 24 is longer. However, if the contact protrusion 24 is too long, the contact condition on the inward top surface of the contact protrusion 24 is close to line contact rather than point contact. In such a case, backlash, which is caused by errors due to resin molding, of the cam ring 2 being fitted around the inner tube 11 is likely not to be negligible.

The application of the present invention is not limited to a lens body tube provided with a cam ring that has cams shaped as shown in the above-mentioned embodiment. For example, each of contact protrusions is formed on a first cam that is located away from a bayonet piece in the optical axis direction, and a cam ring is thereby supported by long contact surfaces in the optical direction, around an inner tube. Such constitution is effective to support the cam ring with higher dimensional accuracy.

The present disclosure relates to the subject matter contained in Japanese Patent Application No. P2004-315247, filed on Oct. 29, 2004, which is expressly incorporated herein by reference in its entirely.

What is claimed is:

1. A lens body tube configured to support at least one lens inside an inner tube such that the at least one lens can be translated along the optical axis direction of the lens body tube, comprising:
   a cam ring configured to be rotatably supported around the outer circumferential surface of the inner tube, the at least one lens being configured to be translated along the optical axis direction accompanied by the rotation of the cam ring;
      a plurality of cams provided on the inner circumferential surface of the cam ring;
      a plurality of cam followers provided on a lens frame supporting each of the at least one lens, each of the plurality of cam followers being engaged with a corresponding one of the plurality of cams through an opening provided on the inner tube; and
      a plurality of first protrusions, each of which is formed integrally with a corresponding one of the plurality of cams, and has contact with the outer circumferential surface of the inner tube.

2. The lens body tube according to claim 1, wherein each of the plurality of first protrusions is protruded inward along the radial direction of the lens body tube on a part of the inward top surface of a corresponding one of the plurality of cams.

3. The lens body tube according to claim 2, wherein each of the plurality of cam followers includes a recessed potion that is formed to avoid interfering with the plurality of first protrusions.

4. The lens body tube according to claim 1, wherein the opening extends in the optical axis direction with a predetermined width in the circumferential direction of the lens body tube, and
wherein each of the plurality of first protrusions is formed longer than the width.

5. The lens body tube according to claim 2, wherein the opening extends in the optical axis direction with a predetermined width in the circumferential direction of the lens body tube, and
wherein each of the plurality of first protrusions is formed longer than the width.

6. The lens body tube according to claim 3, wherein the opening extends in the optical axis direction with a predetermined width in the circumferential direction of the lens body tube, and
wherein each of the plurality of first protrusions is formed longer than the width.

7. The lens body tube according to claim 1, wherein the cam ring includes a plurality of second protrusions that are configured to have contact with the outer circumferential surface of the inner tube to support the cam ring around the inner tube,
wherein the plurality of second protrusions are arranged evenly spaced apart in the circumferential direction,
wherein the plurality of cams are as many as the plurality of second protrusions, and
wherein each of the plurality of first protrusions is arranged substantially at the midpoint between each adjacent couple of the plurality of second protrusions, in the circumferential direction.

8. The lens body tube according to claim 2, wherein the cam ring includes a plurality of second protrusions that are configured to have contact with the outer circumferential surface of the inner tube to support the cam ring around the inner tube,
wherein the plurality of second protrusions are arranged evenly spaced apart in the circumferential direction,
wherein the plurality of cams are as many as the plurality of second protrusions, and
wherein each of the plurality of first protrusions is arranged substantially at the midpoint between each adjacent couple of the plurality of second protrusions, in the circumferential direction.

9. The lens body tube according to claim 3, wherein the cam ring includes a plurality of second protrusions that are configured to have contact with the outer circumferential surface of the inner tube to support the cam ring around the inner tube,
wherein the plurality of second protrusions are arranged evenly spaced apart in the circumferential direction,
wherein the plurality of cams are as many as the plurality of second protrusions, and
wherein each of the plurality of first protrusions is arranged substantially at the midpoint between each adjacent couple of the plurality of second protrusions, in the circumferential direction.

10. The lens body tube according to claim 1, wherein the cam ring is formed by resin molding.

11. The lens body tube according to claim 2, wherein the cam ring is formed by resin molding.

12. The lens body tube according to claim 3, wherein the cam ring is formed by resin molding.

13. The lens body tube according to claim 1, wherein the cam ring is rotated during one of a zooming operation and a focusing operation.

14. The lens body tube according to claim 2, wherein the cam ring is rotated during one of a zooming operation and a focusing operation.

15. The lens body tube according to claim 3, wherein the cam ring is rotated during one of a zooming operation and a focusing operation.

16. A lens body tube configured to support at least one lens inside an inner tube such that the at least one lens can be translated along the optical axis direction of the lens body tube, comprising:
   a cam ring configured to be rotatably supported around the outer circumferential surface of the inner tube, the at least one lens being configured to be translated along the optical axis direction accompanied by the rotation of the cam ring;
  a plurality of cams provided on the inner circumferential surface of the cam ring;
  a plurality of cam followers provided on a lens frame supporting each of the at least one lens, each of the plurality of cam followers being engaged with a corresponding one of the plurality of cams through an opening provided on the inner tube; and
  a plurality of first protrusions, each of which is protruded inward along the radial direction of the lens body tube on a part of the inward top surface of a corresponding one of the plurality of cams, and has contact with the outer circumferential surface of the inner tube,
wherein each of the plurality of cam followers includes a recessed potion that is formed to avoid interfering with the plurality of first protrusions,
wherein the cam ring includes a plurality of second protrusions that are configured to have contact with the outer circumferential surface of the inner tube to support the cam ring around the inner tube,
wherein the plurality of second protrusions are arranged evenly spaced apart in the circumferential direction,
wherein the plurality of cams are as many as the plurality of second protrusions,
wherein the opening extends in the optical axis direction with a predetermined width in the circumferential direction of the lens body tube,
wherein each of the plurality of first protrusions is formed longer than the width, and
wherein each of the plurality of first protrusions is arranged at the midpoint between each adjacent couple of the plurality of second protrusions, in the circumferential direction.

17. The lens body tube according to claim 16,
wherein the cam ring is formed by resin molding.

18. The lens body tube according to claim 16,
wherein the cam ring is rotated during one of a zooming operation and a focusing operation.

19. The lens body tube according to claim 17,
wherein the cam ring is rotated during one of a zooming operation and a focusing operation.

\* \* \* \* \*